United States Patent [19]
Onitsuka et al.

[11] Patent Number: 5,158,582
[45] Date of Patent: Oct. 27, 1992

[54] METHOD OF REMOVING NOX BY ADSORPTION, NOX ADSORBENT AND APPARATUS FOR PURIFYING NOX-CONTAINING GAS

[75] Inventors: Shigenori Onitsuka, Nara; Masayoshi Ichiki, Osaka; Takanobu Watanabe, Kyoto, all of Japan

[73] Assignee: Hitachi Zosen Corporation, Osaka, Japan

[21] Appl. No.: 689,089

[22] Filed: Apr. 22, 1991

Related U.S. Application Data

[63] Continuation of Ser. No. 442,764, Nov. 29, 1989, abandoned.

[51] Int. Cl.⁵ .............................................. B01D 53/08
[52] U.S. Cl. ............................................ 55/68; 55/34; 55/74; 55/75; 55/78; 55/181; 55/387; 55/389; 55/390; 55/524; 423/239
[58] Field of Search .................. 55/68, 75, 77–79, 55/181, 389, 390, 74, 387, 524, 34; 423/239

[56] References Cited

U.S. PATENT DOCUMENTS

| | | |
|---|---|---|
| 3,015,369 | 1/1962 | Brennan .................................. 55/68 |
| 3,242,641 | 3/1966 | Makin, Jr. ............................ 55/68 X |
| 3,689,212 | 9/1972 | Petit et al. ........................... 55/75 X |
| 3,789,106 | 1/1974 | Hay ........................................ 55/68 |
| 4,012,206 | 3/1977 | Macriss et al. ..................... 55/75 X |
| 4,019,879 | 4/1977 | Rabo et al. ............................. 55/68 |
| 4,081,509 | 3/1978 | Hishinuma et al. ................ 55/68 X |
| 4,087,372 | 5/1978 | Saitoh et al. ........................ 55/68 X |
| 4,153,429 | 5/1979 | Matthews et al. .................... 55/68 |
| 4,507,271 | 3/1985 | Van Deyck et al. ................ 55/75 X |
| 4,533,365 | 8/1985 | Ringel ................................. 55/75 X |
| 4,677,096 | 6/1987 | von der Smissen ................ 55/75 X |
| 4,713,090 | 12/1987 | Yokoe et al. ............................ 55/68 |
| 4,717,398 | 1/1988 | Pearce ................................. 55/68 X |
| 4,735,930 | 4/1988 | Gerdes et al. .................. 423/239 A X |
| 4,747,855 | 5/1988 | Hirai et al. ............................ 55/74 |
| 4,748,012 | 5/1988 | Weber et al. ......................... 423/239 |
| 4,798,813 | 1/1989 | Kato et al. ...................... 423/239 X |
| 4,812,147 | 3/1989 | BeVier .................................. 55/68 X |
| 4,867,953 | 9/1989 | Riekert et al. ....................... 423/239 |
| 4,910,004 | 3/1990 | Hamon et al. ...................... 423/239 |
| 4,917,711 | 4/1990 | Xie et al. ............................. 55/74 X |

OTHER PUBLICATIONS

Tamura et al., Study on New System for Removal of $NO_x$ Using Natural Tuff..., Industrial Research Institute, Japan, May 1978.

Primary Examiner—Robert Spitzer
Attorney, Agent, or Firm—Armstrong & Kubovcik

[57] ABSTRACT

The invention provides a method of removing NOx by adsorption wherein a gas containing NOx at a low concentration is brought into contact with an adsorbent comprising a copper salt supported on zeolite serving as a carrier, whereby the NOx is adsorbed and removed efficiently. The adsorbent for use in this method comprises at least one copper salt supported on natural or synthetic zeolite, the copper salt being selected from the group consisting of copper chloride, double salt of copper chloride and ammine complex salt of copper chloride. The apparatus of the invention for purifying an NOx-containing gas comprises an adsorptive dehumidifier for dehumidifying the gas with a dehumidifying agent and regenerating the agent with a purified gas, and an adsorptive denitration unit for denitrating the dehumidified gas. The denitration unit has an adsorbent regenerating zone provided with a channel for recycling an $NH_3$-containing regenerating gas and with a channel for withdrawing a portion of the regenerating gas from the recycling channel, passing the withdrawn gas through a denitration reactor and then releasing the denitrated gas into the atmosphere.

13 Claims, 6 Drawing Sheets

METHOD OF REMOVING NOX BY ADSORPTION, NOX ADSORBENT AND APPARATUS FOR PURIFYING NOX-CONTAINING GAS

This application is a continuation of application Ser. No. 442,764 filed Nov. 29, 1989, now abandoned.

BACKGROUND OF THE INVENTION

The present invention relates to a method of efficiently removing nitrogen oxides (NOx) of relatively low concentration from the gas discharged by ventilation, for example, from various highway tunnels, mountain tunnels, underwater tunnels, underground roads, sheltered roads, etc. (hereinafter referred to collectively as "highway tunnels"), agents for removing NOx by adsorption, and apparatus for purifying NOx-containing gases.

With highway tunnels having a large length and a great vehiclular traffic volume, it is necessary to withdraw the air from the tunnel at a considerable rate for ventilation in order to assure the drivers and passengers of health and increase the least distance of distinct vision. Even with tunnels of relatively short distance, it is practice to ventilate the tunnel to control air pollution due to carbon monoxide (CO), NOx and the like which are concentrically released from the inlet and outlet of the tunnel when the tunnel is located in an urban area or suburban area.

However, if the gas resulting from ventilation is released as it is in the neighborhood, the contaminated gas entails environmental pollution over the area concerned. Especially in cities or suburbs where the pollution due to motor vehicle emissions spreads out two-dimensionally, heavy pollution will then become more widespread. Exactly the same problem as above will be encountered in the case where roadway tunnels or sheltered tunnels are to be constructed as a pollution control measure for existing roads.

The present invention relates to a method of efficiently removing NOx of low concentration from the gas removed from highway tunnels by ventilation, NOx adsorbents for use in this method, and an apparatus for use in practicing the method for purifying the NOx-containing gas.

PRIOR ART

The gas released from tunnels by ventilation is characterized in that it has a low NOx concentration of about 5 ppm and ordinary temperature and varies greatly in quantity according to the traffic volume.

Processes have heretofore been investigated for removing NOx produced from fixed sources in order to purify the combustion exhaust gas from boilers. These processes are divided generally into the following three types.

(1) Catalytic Reduction Process

In this process, NOx in the exhaust gas is selectively reduced to harmless nitrogen and water vapor using ammonia as a reducing agent. This process is most generally used for denitrating exhaust gases from boilers. With this process, however, the gas to be treated must be heated to at least 200° C., so that the process is not economical for treating the gas from highway tunnels since the gas, having ordinary temperature and in a large quantity, must be heated with a large amount of energy.

(2) Wet Absorption Process

This process utilizes the fact that nitrogen dioxide ($NO_2$) and nitrogen trioxide ($N_2O_3$) can be readily absorbed by a liquid absorbent such as water or an aqueous alkali solution. The NO in the gas to be treated is oxidized using the liquid absorbent with an oxidation catalyst or ozone injected into the absorbent, and the resulting $NO_2$ and $N_2O_3$ are caused to be absorbed by the absorbent. However, this process is complex because NOx is accumulated in the absorbent in the form of nitrates and nitrites, necessitating the maintenance and aftertreatment of the absorbent, i.e., treatment of waste liquid. The process further has a problem as to economy since the cost of the oxidizing agent per mole is higher than that of the reducing agent $NH_3$ for use in the selective catalytic reduction process.

(3) Dry Adsorption Process

This process removes NOx from the exhaust gas with use of a suitable absorbent. Several processes of this type had been investigated before the selective catalytic reduction process was placed into wide use for denitrating boiler exhaust gases. Nevertheless, since the boiler exhaust gas has a high NOx concentration, a high temperature and a high water content, the dry absorption process is economically inferior to the catalytic reduction process and has not been introduced into use.

However, when the dry adsorption process was investigated again for purifying the gas resulting from the ventilation of highway tunnels, the process was found simple but economical, contrary to the same process as applied to the treatment of boiler exhaust gases.

Studies on the removal of NOx by adsorbents include the study on the adsorptive removal of NOx of low concentration from combustion exhaust gases made by Industrial Development Research Institute (foundation of Japan) ("Research on Development of New Denitration System with Use of Special Adsorptive Oxidizing Catalysts," 1978 May). They conducted tests with an air-$H_2O$-NO simulated gas (inlet NO concentration 100–120 ppm, dry gas (dew point $-17°$ C.), SV 3270 $hr^{-1}$) and reported that an adsorbent comprising a copper metal (oxide) as supported on natural tuff was found useful.

The NOx concentration of the gas from highway tunnels is estimated to be up to 5 ppm. The report suggests nothing as to whether NOx as low as 5 ppm in concentration can be efficiently adsorbed by the adsorbent used in the above study (NOx concentration about 100 ppm).

Up to date, no reports have been made on adsorbents capable of efficiently adsorbing and removing NOx of low concentration of 5 ppm.

In view of the foregoing situation, accordingly, a first object of the present invention is to provide a method of efficiently removing NOx of low concentration by adsorption from the gas released from highway tunnels by ventilation.

Another object of the present invention is to provide an NOx adsorbent for use in this method.

Conventional apparatus for purifying exhaust gases by the adsorption of NOx are divided generally into those of the fixed bed type and those of the moving bed type.

The apparatus of the fixed bed type comprises a plurality of adsorbers arranged in parallel. When the concentration of the substance to be removed has reached a limit at the outlet of one of the adsorbers, with a predetermined quantity of the substance adsorbed by an adsorbent therein, the adsorber is changed over to another adsorber, and the substance is desorbed to regenerate the adsorbent. When a large quantity of gas is to be handled, the adsorber is charged with a reduced amount of adsorbent in view of the gas flow resistance, so that the adsorber is changed over more frequently. Although the time required for desorption or regeneration needs to be considered, the apparatus then requires an increased number of adsorbers as arranged in parallel and becomes greater in overall scale.

With the apparatus of the moving bed type, on the other hand, the gas to be treated is generally brought into countercurrent contact with an adsorbent in an adsorber, from which the adsorbent having adsorbed a large quantity of the substance to be removed is continually withdrawn for regeneration by desorption, while a fresh portion or the regenerated portion of adsorbent is continually charged into the adsorber. Accordingly, the apparatus can be operated continuously, requires no change-over and can therefore be smaller in scale than the apparatus of the fixed bed type.

FIG. 10 shows as a prior-art apparatus the NOx removal system disclosed in the foregoing literature of the research institute.

The NOx removal system will be described below with reference to FIG. 10.

Silica gel serving as a dehumidifying agent is charged in a dehumidifier 48 in the upper portion of a dehumidifying tower 47 and is caused to adsorb water from an exhaust gas (Nox + air + $H_2O$) supplied via a channel 41. On adsorption of water, the dehumidifying agent moves downward into a regenerator 49 under gravity. In the regenerator 49, the agent is brought into contact with regenerating dry gas (from the outlet of an adsorber 51 in an adsorption tower 50) introduced thereinto via a channel 43, whereby the adsorbed water is removed from the agent. In this way, the dehumidifying agent is regenerated and forced upward by the dry gas into the dehumidifier 48 to circulate through the dehumidifying tower 47.

Thus, the silica gel serving as the dehumidifying agent repeatedly adsorbs and releases (for regeneration) water while circulating through the tower 47. The exhaust gas supplied through the channel 41 is dehumidified and flows through a channel 42 into the adsorber 51 in the upper portion of the adsorption tower 50. The regenerating dry gas led through the channel 43 into the regenerator 49 in the dehumidifying tower 47 is given water therein and released into the atmosphere as a purified gas (air + $H_2O$).

On the other hand, an NOx adsorbent is charged in the adsorber 51 of the adsorption tower 50 and adsorbs NOx from the dry exhaust gas (air + NOx) from the dehumidifying tower 47. The adsorbent having adsorbed the NOx moves downward into a desorptive regenerator 52 under gravity. In the regenerator 52, the NOx adsorbent is heated to 400° C. by a heater 46, comes into contact with the dry purge gas to be described below to release the adsorbed NOx for regeneration, and is forced upward into the upper portion of the adsorption tower 5.

The outlet gas from the adsorber 51 is used partially as the regenerating dry gas to be introduced into the desorptive regenerator 52 via a channel 44. In the regenerator 52, the gas removes the NOx from the adsorbent and discharged from the system via a channel 45 as a desorption gas. The dry exhaust gas (NOx + air) introduced into the adsorber 51 from the dehumidifier 48 via the channel 42 is denitrated in the adsorber 51 into purified dehumidified air, a major portion of which is led through the channel 43 into the regenerator 49 of the dehumidifying tower 47 as the dry gas for regenerating the dehumidifying agent. The remainder of the air is introduced into the adsorptive regenerator 52 of the adsorption tower 50 as the dry gas for regenerating the NOx adsorbent.

The desorption gas discharged from the system via the channel 45 contains the NOx desorbed from the adsorbent. Accordingly, it has been proposed to remove the NOx from the gas by causing an aqueous alkali solution or the like to absorb the NOx (wet absorption process). However, the wet absorption process is complex and costly to practice since the NOx are accumulated in the form of nitrates and nitrites in the liquid absorbent, necessitating the maintenance and aftertreatment of the absorbent (aftertreatment of waste liquid).

To make the desorption gas free from contaminants and release the gas to the atmosphere, a process has already been proposed in which an adsorbent having adsorbed NOx is treated with $NH_3$-containing air for regeneration (see Unexamined Japanese Patent Publication No. 15593/88). With this process, the NOx is subjected to a selective reduction reaction with $NH_3$ to reduce the adsorbed NOx to harmless $N_2$ and $H_2O$ and remove the NOx. Further when the NOx-adsorbing adsorbent is to be regenerated merely by heating, the adsorbent must be heated to 400° C. as already mentioned, whereas if zeolite having supported thereon a copper salt with a denitrating catalytic function is used as an NOx adsorbent, the adsorbent can be regenerated by bringing the adsorbent into contact with $NH_3$-containing air (regenerating gas) at a low temperature of 100° to 300° C. (see Japanese Patent Application No. 133446/88).

The above process wherein the $NH_3$-containing gas is used for regenerating the NOx adsorbent has the likelihood that the NOx removed from the adsorbent will remain partly unreacted with $NH_3$, as contained in the desorption gas, or an excess of $NH_3$ will be contained in the desorption gas. To render the desorption gas free from the excessive $NH_3$, the concentration of $NH_3$ to be injected into the regenerating gas must be controlled accurately. Conversely, if the amount of $NH_3$ injected is insufficient, the NOx adsorbent will not be regenerated fully, making it extremely difficult to operate the desorptive regenerator for the NOx adsorbent.

In the case where a somewhat excessive amount of $NH_3$ is injected into the regenerating gas to ensure complete regeneration of the NOx adsorbent, the desorption gas contains an excess of $NH_3$ and therefore needs to be introduced into another denitration reactor and made harmless through the denitration reaction between NOx and $NH_3$ or oxidation decomposition reaction of $NH_3$. With the dehumidifier and the NOx adsorber of the moving bed type included in the NOx adsorption system of the research institute, it is necessary for the flow channels to have an increased cross sectional area to reduce the resistance offered to the flow of gases when a large quantity of exhaust gas is to be handled. To achieve an improved adsorption efficiency, on the other hand, it is required to withdraw adsorbent particles from the flow channel as uniformly spread out in the direction of the cross section of the channel and charge them into the unit similarly, whereas this encounters extreme difficulties. Further with the adsorption tower of the moving bed type, gravity is utilized for moving the adsorbent, and the regenerated adsorbent is forced upward through the tower by dry air, so that the abrasion, cracking and particulation of the adsorbent itself, and the abrasion of the inner surfaces of the tower and lift pipe pose problems, while the tower is complex in construction, and the apparatus is not easy to operate.

Accordingly, a third object of the present invention is to provide an apparatus for purifying NOx-containing gases free of the foregoing problems of the prior art.

SUMMARY OF THE INVENTION

The present invention provides a method of removing NOx by adsorption wherein a gas containing NOx at a low concentration is brought into contact with an adsorbent comprising a copper salt supported on zeolite serving as a carrier, whereby the NOx is adsorbed and removed efficiently.

The method of the present invention wherein the above-mentioned adsorbent is used efficiently removes NOx from a gas released by ventilation from highway tunnels, having a low NOx concentration of about 5 ppm and ordinary temperature, and greatly varying in quantity in accordance with the vehicular traffic volume.

The adsorbent to be used in the method of the invention comprises at least one copper salt supported on natural or synthetic zeolite. Examples of preferred copper salts are copper chloride, double salts of copper chloride and ammine complex salt of copper chloride.

The apparatus of the invention for purifying an NOx-containing gas comprises an adsorptive dehumidifier for dehumidifying the gas and regenerating a dehumidifying agent with a purified gas, and an adsorptive denitration unit for denitrating the NOx-containing gas resulting from dehumidification. The denitration unit has an adsorbent regenerating zone which is provided with a gas recycling channel for recycling a regenerating gas containing $NH_3$, and a gas withdrawing channel for withdrawing a portion of the regenerating gas from the recycling channel, passing the gas through a denitration reactor and thereafter releasing the denitrated gas into the atmosphere.

The adsorptive dehumidifier and the adsorptive denitration unit are each preferably a rotary adsorber for continuously moving the dehumidifying agent or the NOx adsorbent therein at right angles with the flow of gas, whereby the dehumidifying agent or the NOx adsorbent can be withdrawn, regenerated and charged continuously.

With the NOx-containing gas purifying apparatus of the present invention, an excess of $NH_3$ can be caused to be present in the adsorbent regenerating zone. This assures the regenerating zone of a sufficient supply of $NH_3$ for removing the NOx adsorbed by the adsorbent more completely upon reduction to completely regenerate the NOx adsorbent. Accordingly, there is no need to accurately control the injection of $NH_3$.

DESCRIPTION OF THE PREFERRED EMBODIMENTS

Figure 1:
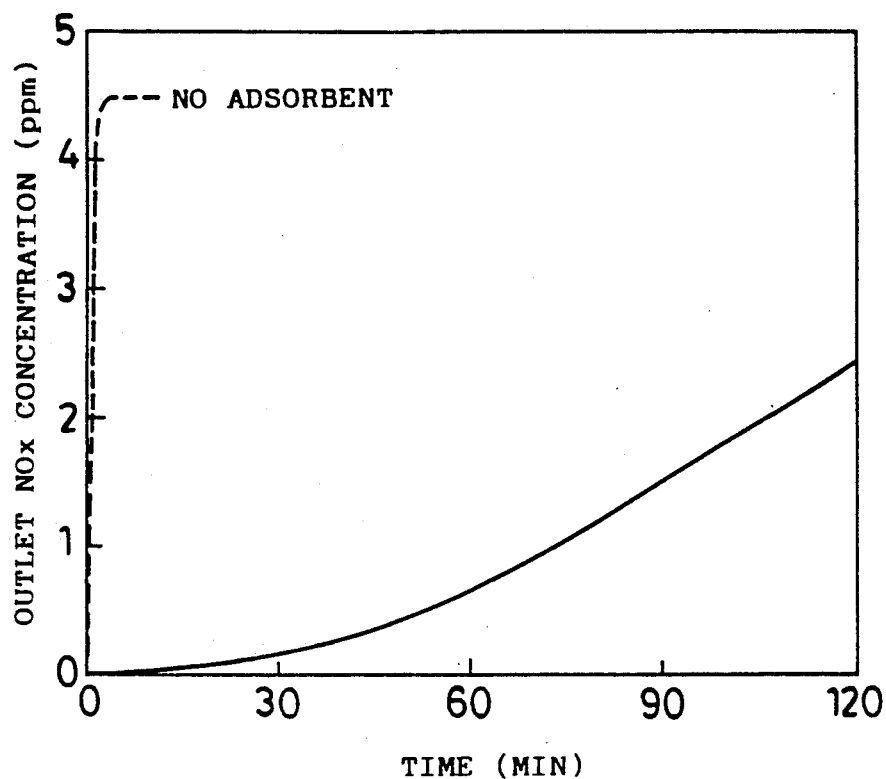
FIGS. 1 to 5 are graphs showing the relationship between the time and the outlet NOx concentration.

One of the features of the adsorbent of the present invention is that natural or synthetic zeolite is used as its carrier. To shape the adsorbent or carrier, components other than zeolite may be present as binders or diluents, such as alumina sol, alumina, silica sol, silica-alumina and the like.

The carrier for the adsorbent of the invention can be natural zeolite or synthetic zeolite. Suitable natural zeolites are faujasite, mordenite and the like. Synthetic faujasite, synthetic mordenite, etc. can be used as synthetic zeolites. Synthetic faujasites include, for example, A-type zeolite ($SiO_2/Al_2O_3$ mole ratio: $1.85\pm0.5$), X-type zeolite ($SiO_2/Al_2O_3$ mole ratio: $2.5\pm0.5$) and Y-type zeolite ($SiO_2/Al_2O_3$ mole ratio: $4.5\pm1.5$). Synthetic mordenites include, for example, L-type zeolite ($SiO_2/Al_2O_3$ mole ratio: $6.4\pm0.5$) and the zeolite produced by Norton Co. Especially desirable zeolites are those at least 2 in $SiO_2/Al_2O_3$ mole ratio.

Another feature of the adsorbent of the present invention is that at least one specific copper salt is supported on the carrier. Examples of preferred copper salts are a copper chloride ($CuCl_2$), double salts of the copper chloride such as ammonium cupric chloride ($CuCl_2 \cdot 2NH_4Cl$), and ammine complex salt of the copper chloride.

The amount of copper salt to be supported on the carrier is about 0.1 to about 20 wt. %, preferably about 0.5 to about 10 wt. %, calculated as metal copper and based on the adsorbent finally obtained.

The carrier is made to support the copper salt thereon generally by immersing zeolite in a solution of the copper salt in a suitable solvent.

The amount of copper salt to be supported is adjusted, for example, by varying the copper salt concentration or the temperature of the solution, or the immersion time.

After the immersion in the copper salt solution, the carrier is withdrawn from the solution, washed with water and dried in air at about 110° to about 120° C. When required, the dried product is baked in air at about 300° to about 500° C. When the adsorbent is to be used continually through repeated adsorption and desorption for regeneration, it is desired to heat-treat the adsorbent at a temperature slightly higher than the highest temperature at which the adsorbent is used.

The adsorbent is not limited specifically in shape. Preferably, it is so shaped as to have a large contact area and permit the gas to flow smoothly. For example, the adsorbent is in the form of solid cylinders, balls, Raschig rings or honeycomb.

The present method of removing NOx by adsorption is practiced under the conditions usually employed for the dry adsorption process.

Next, a gas purifying apparatus of the invention as adapted to purify the gas released from highway tunnels by ventilation (ventilation gas) will be described in detail with reference to the flow chart of FIG. 7.

A ventilation gas containing NOx is introduced into an adsorptive dehumidifier 1 through a ventilation gas channel 8 to remove water from the gas with a dehumidifying agent by adsorption and dry the gas. The gas is then led into an adsorptive denitration unit 2 to remove the NOx from the gas by adsorption and obtain a purified gas.

The dehumidifying agent in the dehumidifier 1 is regenerated by the purified gas. On the other hand, the adsorbent having adsorbed the NOx in the denitration unit 2 is regenerated by a $NH_3$-containing regenerating gas.

The most distinct feature of the present invention is that a major portion of the regenerating gas having $NH_3$ injected thereinto by an $NH_3$ feeder 3 is recycled by a blower 4 on a gas recycling channel 9 for use in an adsorbent regenerating zone of the adsorptive denitration unit 2 to regenerate the NOx adsorbent, and that a portion of the regenerating gas is withdrawn as a purge gas through a gas withdrawing channel 10, then passed through a denitration reactor 5 and thereafter released into the atmosphere.

In the case where the NOx adsorbent is to be regenerated by the $NH_3$-containing gas, it is desired that the adsorbent to be regenerated and the regenerating recycle gas be heated to a suitable temperature (100° to 300° C.) by a heater 6 so as to react the NOx adsorbed by the adsorbent with the $NH_3$ efficiently.

When the NOx adsorbent is to be regenerated by the prior-art process described, it is necessary to accurately diffuse $NH_3$ of low concentration into the regenerating gas in an amount corresponding to the amount of NOx adsorbed by the adsorbent, i.e., in an amount required and sufficient for the removal of NOx by reduction. While this amount is not controllable unless the amount of adsorbed NOx is accurately measured, it is actually impossible to continuously measure the amount of NOx in the adsorbent which is solid. In actuality, therefore, the conventional technique for regenerating the NOx adsorbent is very likely to result in leakage of excessive $NH_3$ or incomplete regeneration of the adsorbent due to an insufficient amount of injected $NH_3$.

In contrast, with the present apparatus, an excess of $NH_3$ can be made to be present in the adsorbent regenerating zone. The supply of a sufficient quantity of $NH_3$ to the regenerating zone makes it possible to completely remove the adsorbed NOx from the adsorbent by reduction and to completely regenerate the adsorbent. Consequently, there is no need to accurately control the injection of $NH_3$. Thus, the gas purifying apparatus of the present invention is a very useful and economical apparatus.

While the regenerating recycle gas is partly withdrawn as a purge gas, the excessive $NH_3$ contained in the purge gas and the unreacted NOx desorbed from the adsorbent and present in the gas are rendered harmless by the denitration reactor 5 which is provided downstream from a heater 7. The purge gas to be treated by the denitration reactor 5 is very small in amount. The reactor 5 can therefore be of a small size, and the purge gas can nevertheless be made harmless effectively and inexpensively.

Figure 7:
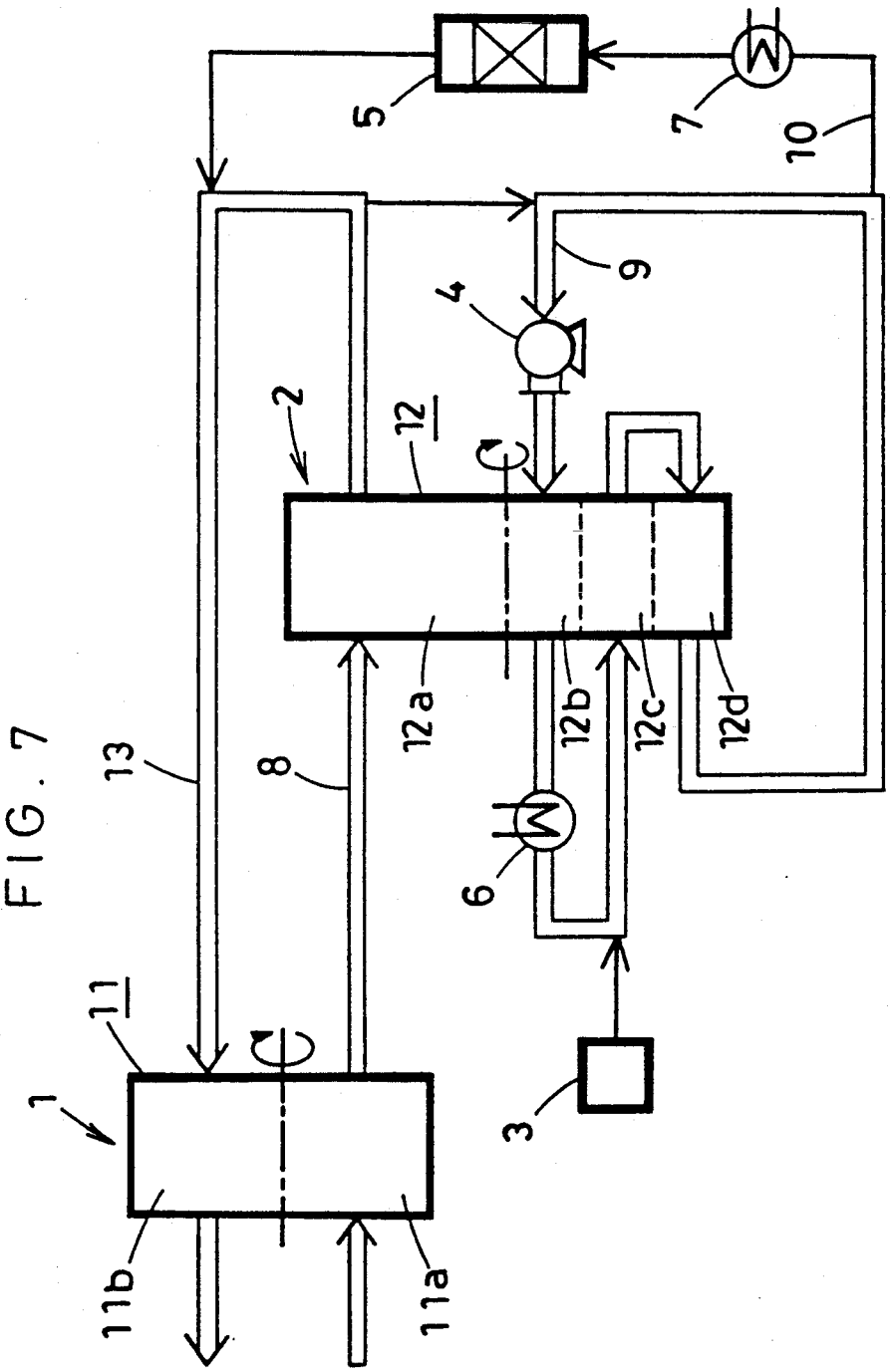
FIG. 7 is a flow chart showing an embodiment of the invention.

With reference to the flow chart of FIG. 7, a reduced gas purification efficiency will result if the regenerating recycle gas leaks into the ventilation gas cleaned of NOx. When at least 60% of purification efficiency is a target, the leakage of the regenerating recycle gas into the purified ventilation gas poses a serious problem.

Figure 9:
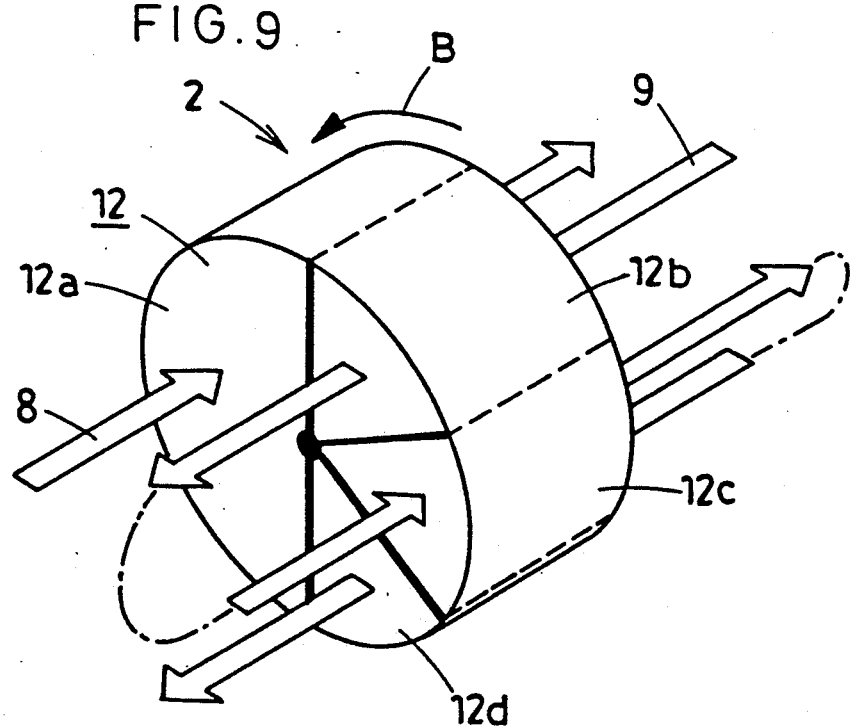
FIG. 9 is a perspective view showing a rotary NOx adsorber.
Figure 10:
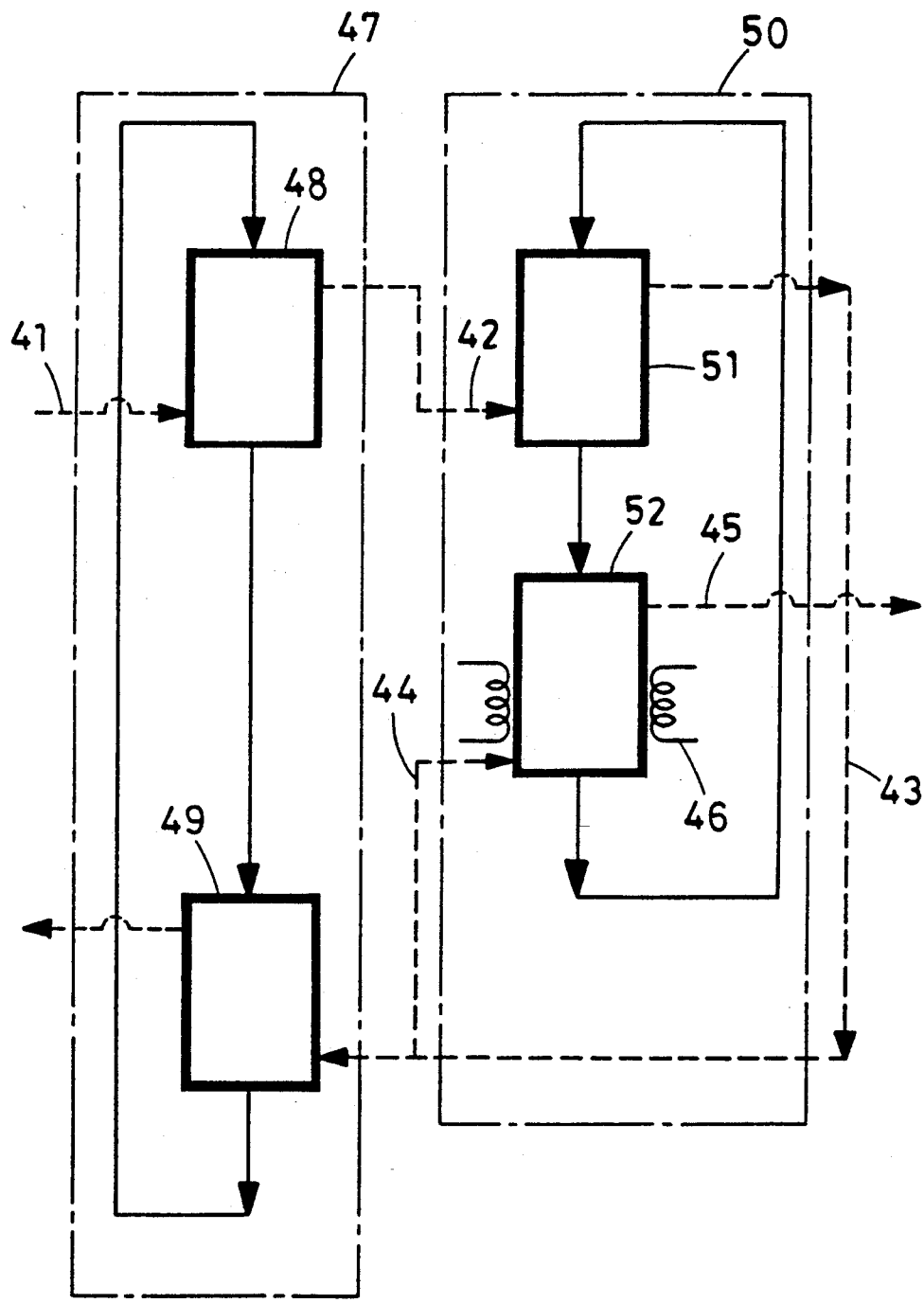
FIG. 10 is a flow chart showing a conventional process for removing NOx.

As shown in FIG. 9, the adsorptive denitration unit 2 is a rotary adsorber, in which an adsorbent rotor is in sliding contact with ventilation gas and regenerating gas nozzles. It is difficult to completely seal off these sliding portions. Accordingly, the operating pressure of the regenerating portion (cooling, regeneration and preheating) is made lower than that of the NOx adsorbing portion to prevent the reduction in purification efficiency due to gas leaks. In this case, the gas leaks from the adsorbing portion into the regenerating portion. The amount of gas corresponding to the leak is withdrawn from the regenerating gas recycling channel 9. The NOx adsorbent adsorbs NOx and a small amount of water, which are desorbed in the regenerating portion and accumulate in the regenerating recycle gas. To limit the water content of the regenerating recycle gas to a predetermined level, a specified amount of dry air is supplied to the gas recycling channel 9 via the sliding portion, and the water-containing recycle gas is partially withdrawn from the channel 9.

In other words, consideration is given to the apparatus of the invention, such that the leak gas from the sliding portion serves as the main source for supplying dry air to the regenerating recycle gas.

Next, a purifying apparatus will be described which comprises rotary adsorbers serving as adsorptive dehumidifier and denitration unit.

The rotary adsorbers shown in the flow chart of FIG. 7 are adapted to continually withdraw, regenerate and charge the dehumidifying agent and the NOx adsorbent. The apparatus is adapted to exhibit performance equivalent to that of the prior-art apparatus already described, by a simpler construction of reduced gas flow resistance and is therefore very useful.

Figure 8:
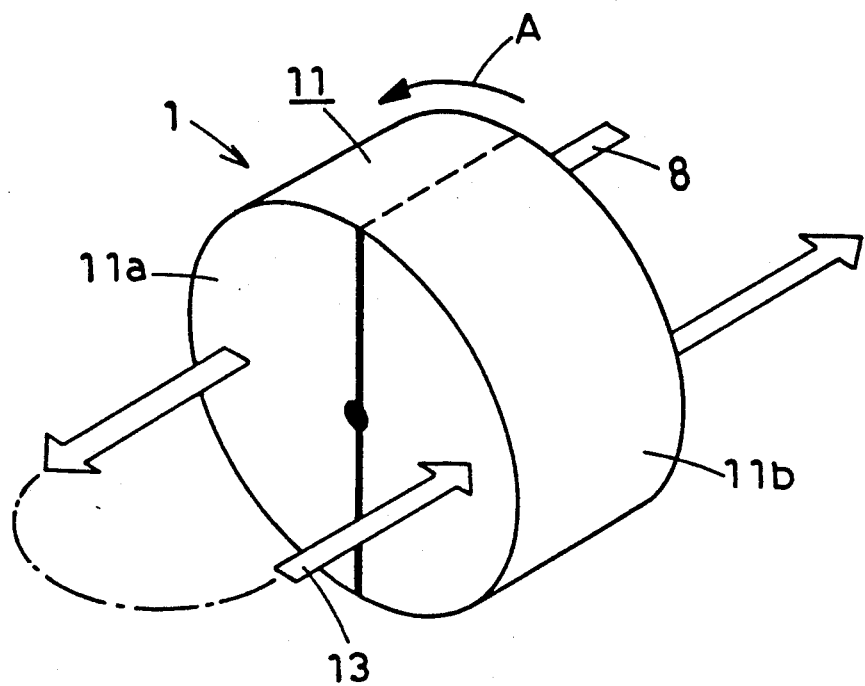
FIG. 8 is a perspective view showing a rotary dehumidifier.

An example of rotary dehumidifier will be described with reference to FIG. 8. In the dehumidifier 1 for use in the purifying apparatus of the invention, the ventilation gas to be purified is dehumidified by a dehumidifying agent, which is regenerated by a denitrated purified dry gas. The dehumidifying agent is regenerated by the dry gas which is approximately in the same amount as the ventilation gas to be purified. The dehumidifier 1 comprises a rotor 11 of dehumidifying agent. Useful as the rotor 11 is an assembly of adsorbent plates comprising silica gel as a water adsorbent and arranged in layers with a suitable spacer interposed between each two adjacent plates, an assembly of adsorbent flat plates and corrugated adsorbent plates which are alternately arranged in layers and which comprise silica gel as a water adsorbent, or a water adsorbent of silica gel in the form of a unitary honeycomb structure. An NOx-containing ventilation gas channel 8 is so disposed that the ventilation gas flows through a zone 11a having a semicircular cross section and provided by the right or left half of the rotor 11 as it is seen axially thereof. A purified ventilation gas channel 13 is so disposed that the regenerating dry gas flows through a zone 11b having a semicircular cross section and provided by the other half of the rotor 11. The rotor 11 is rotated in the direction of arrow A to effect continuous dehumidification.

Next, an example of rotary adsorptive denitration unit will be described with reference to FIG. 9. The denitration unit 2 for use in the purifying apparatus of the invention removes NOx from the dehumidified ventilation gas by adsorption to obtain a purified dry ventilation gas and, at the same time, regenerates the NOx adsorbent with an NH₃-containing regenerating recycle gas. The denitration unit 2 comprises a rotor 12 of NOx adsorbent. Useful as the rotor 12 is an assembly of plates of an adsorbent comprising a copper salt supported on a zeolite carrier and arranged in layers with a suitable spacer interposed between each two adjacent plates, an assembly of flat adsorbent plates and corrugated adsorbent plates which are arranged alternately in layers and which are made of an adsorbent comprising a copper salt supported on a zeolite carrier, or an adsorbent comprising a copper salt supported on a zeolite carrier in the form of a unitary honeycomb structure. The ventilation gas channel 8 is so disposed that the dehumidified ventilation gas flows through a zone 12a having a semicircular cross section and provided by one of the right and left halves of the rotor 12 as it is seen axially thereof. The rotor 12 is further provided with a gas recycling channel 9 so that the NH₃-containing regenerating recycle gas flows successively through zones 12b, 12c and 12d having a sectorial cross section and provided by the respective one-third portions of the other half of the rotor 12. Consequently, the NOx is adsorbed in the zone 12a, the rotor 12 is cooled in the zone 12b, the rotor 12 is regenerated in the zone 12c, and the rotor 12 is preheated in the zone 12d.

EXAMPLES

The advantages of the present invention will be substantiated with reference to the following examples and comparative examples.

EXAMPLE 1

Y-type zeolite, product of Nishio Kogyo Co., Ltd. (SiO₂/Al₂O₃=4.7, brand name SK-40, 1/16-inch extrudates) were crushed to obtain a 10- to 14-mesh fraction by screening. The particulate carrier thus obtained was immersed in 1 mol/liter aqueous solution of cupric chloride ($CuCl_2$) in three times the volume of the carrier at room temperature for 16 hours. The carrier was washed with water, then dried at 110° to 120° C. for 2 hours and further baked at 400° C. for 3 hours to obtain an adsorbent ($CuCl_2$-Y). (The amount of copper supported: 6.5 wt. %.)

The adsorbent (7 g, about 12 cm³) was packed in a stainless steel reactor tube, 22 mm in inside diameter, dried at about 235° C. for 1 hour while passing dry air (dew point: about −35° C.) through the tube at a flow rate of 5 liters/min and thereafter allowed to cool to room temperature. After cooling, the passage of dry air was discontinued, dry air containing 4.48 ppm of nitrogen monoxide was introduced into the reactor tube at a rate of 5 liters/min, and the NOx concentration of the gas flowing out from the packed layer of absorbent was continuously measured immediately after the introduction of air using a chemiluminescent detector. FIG. 1 shows variations in the NOx concentration in the outlet gas with time. The diagram reveals that the time taken for the NOx concentration of the outlet gas to reach 10% of the inlet concentration, i.e., 0.45 ppm, was 49.7 minutes. (The time will hereinafter be referred to as "break through time.")

COMPARATIVE EXAMPLE 1

Figure 2:
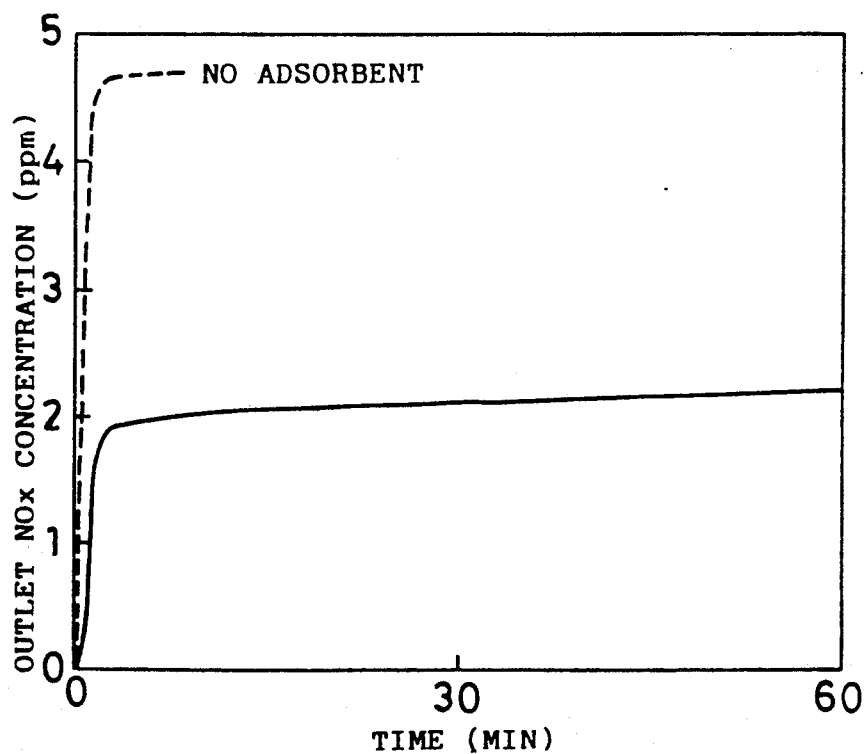

FIG. 2 shows variations in the outlet NOx concentration with time was measured under the same conditions as in Example 1 except that the particulate carrier prepared in Example 1 was used in place of the adsorbent and that the inlet NOx concentration was 4.67 ppm. As will be apparent from the diagram, the break through time in this case was 0.8 minute. This indicates that the use of the zeolite carrier alone with no copper salt supported thereon results in a reduced amount of NOx adsorbed.

COMPARATIVE EXAMPLES 2 AND 3

Figure 3:
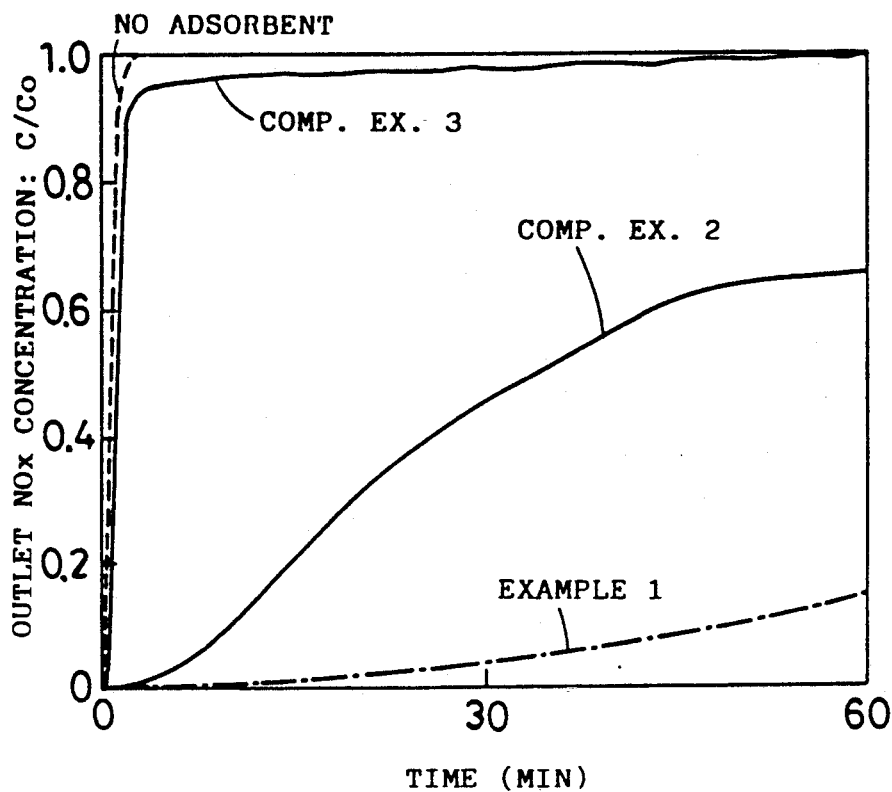

An adsorbent comprising cupric chloride supported on a carrier by impregnation was prepared in the same manner as in Example 1 with the exception of using gamma-alumina (Comparative Example 2) or kieselguhr (Comparative Example 3) as a carrier material in place of Y-type zeolite. FIG. 3 shows variations in the outlet NOx concentration (C) with time as determined under the same conditions as in Example 1 except that the above adsorbent was used and that the inlet NOx concentration ($C_0$) was 4.6 ppm. The diagram indicates that the adsorbent prepared using gamma-alumina or kieselguhr as the carrier material fails to adsorb a sufficient amount of NOx.

COMPARATIVE EXAMPLES 4–6

Figure 4:
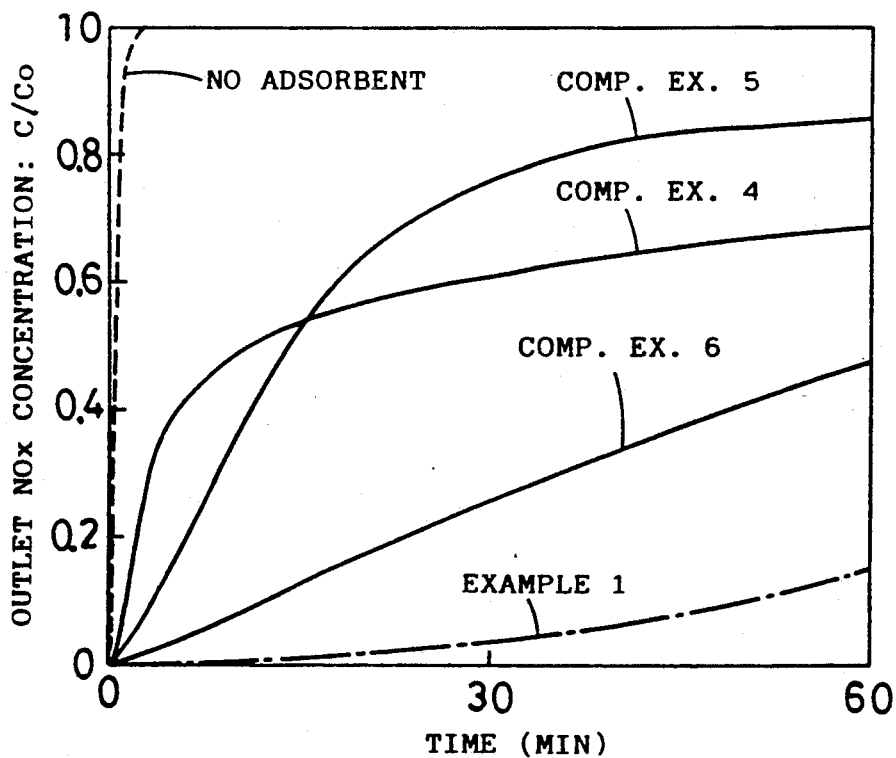

Adsorbents were prepared in the same manner as in Example 1 except that the aqueous metal salt solutions used in place of 1 mol/liter aqueous solution of cupric chloride were an aqueous solution of ferric chloride, $FeCl_3$ (Comparative Example 4), aqueous solution of cobalt chloride, $CoCl_2$ (Comparative Example 5) and aqueous solution of chromic chloride, $CrCl_3$ (Comparative Example 6) which had the same concentration as the cupric chloride solution. FIG. 4 shows variations in the outlet NOx concentration with time as determined under the same conditions as in Example 1 except that the above adsorbents were used and that the inlet NOx concentration was 4.5 to 4.6 ppm. The diagram shows that the use of base metal salts other than the copper salt results in an insufficient amount of adsorbed NOx.

EXAMPLES 2 AND 3, AND COMPARATIVE EXAMPLES 7–10

Adsorbents were prepared in the same manner as in Example 1 with the exception of using, in place of 1 mol/liter aqueous solution of cupric chloride, an aqueous solution of 1 mol/liter of copper nitrate, $Cu(NO)_3$ (Comparative Example 7), aqueous solution of 1 mol/liter of copper sulfate, $CuSO_4$ (Comparative Example 8), aqueous solution of 0.5 mol/liter of copper bromide, $CuBr_2$ (Comparative Example 9), aqueous solution of 0.5 mol/liter of copper acetate $Cu(CH_3COO)_2$ (Comparative Example 10), aqueous solution of 1 mol/liter of ammonium cupric chloride, $CuCl_2.2NH_4Cl$ (Example 2) and a solution prepared by adding ammonia water to an aqueous solution of 1 mol/liter of cupric chloride until cupric ammonia complex was formed (Example 3).

Figure 5:
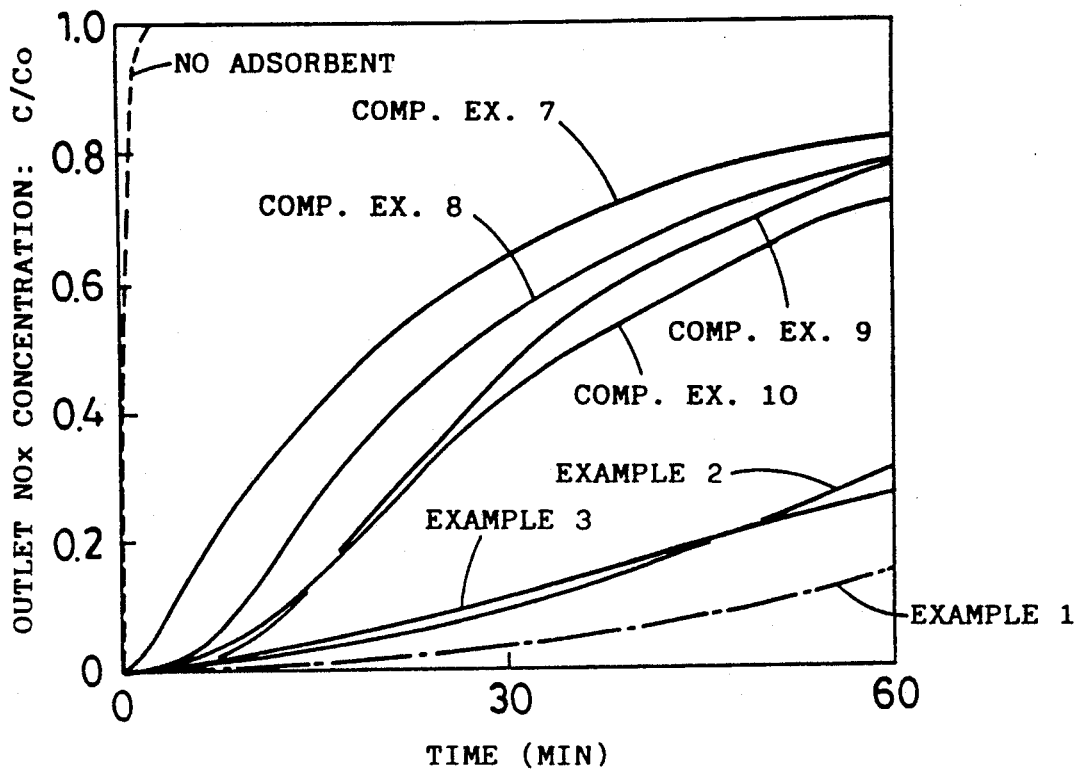

FIG. 5 shows variations in the outlet NOx concentration measured under the same conditions as in Example 1 except that these adsorbents were used and that the inlet NOx concentration was 4.6 to 4.8 ppm.

The diagram reveals that the adsorbent comprising ammonium cupric chloride or ammine complex salt of cupric chloride exhibits an excellent NOx adsorbing property.

EXAMPLE 4

Adsorbents comprising different amounts of copper were prepared in the same manner as in Example 1 using as a zeolite carrier the same Y-type zeolite ($SiO_2/Al_2O_3$ mole ratio: 4.7) as used in Example 1, or "zeolite 1" ($SiO_2/Al_2O_3$ mole ratio: 2.4) having a lower $SiO_2$ content or "zeolite 2" ($SiO_2/Al_2O_3$ mole ratio: 10) with a higher $SiO_2$ content, and using aqueous solutions of cupric chloride or ammonium cupric chloride of varying concentrations. Table 1 and FIG. 6 show the amount of copper supported in these adsorbents and the break through time achieved thereby and measured under the same conditions as in Example 1.

It is seen that adsorbents of excellent NOx adsorbing property can be obtained with use of zeolite carriers which are not lower than about 2 in $SiO_2/Al_2O_3$ mole ratio.

Figure 6:
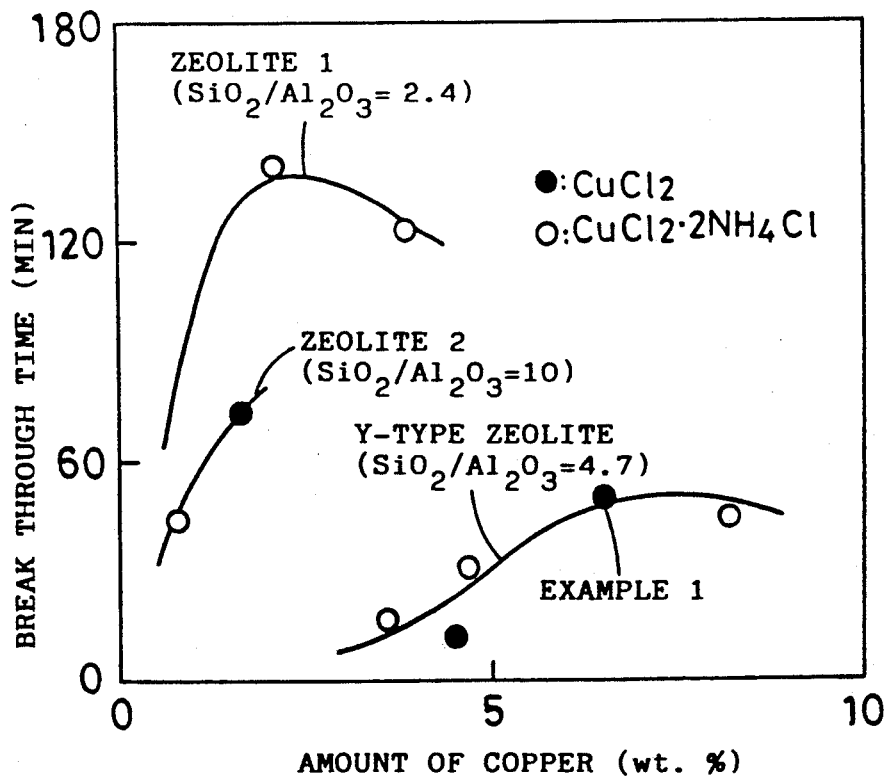
FIG. 6 is a graph showing the relationship between the amount of copper supported on carriers and the break through time.

FIG. 6 shows that the preferred amount of cupric chloride or a double salt thereof, i.e., ammonium cupric chloride, to be supported is about 0.5 to about 10 wt. % calculated as copper and based on the adsorbent obtained although the amount varies with the carrier used.

TABLE 1

| Carrier | Supported substance | Amount of Cu (wt. %) | Break through time (min) |
|---|---|---|---|
| Y-type zeolite $SiO_2/Al_2O_3$ mole ratio = 4.7 | Cupric chloride | 6.5* | 49.7* |
| | $CuCl_2$ | 4.5 | 12.3 |
| | Ammonium cupric chloride | 8.2 | 45.0 |
| | | 4.7** | 31.0** |
| | $CuCl_2 \cdot 2NH_4Cl$ | 3.6 | 17.0 |
| Zeolite 1 $SiO_2/Al_2O_3$ mole ratio = 2.4 | $CuCl_2 \cdot 2NH_4Cl$ | 3.8 | 123.3 |
| | | 2.1 | 141.3 |
| Zeolite 2 $SiO_2/Al_2O_3$ mole ratio = 10 | $CuCl_2$ | 1.6 | 73.2 |
| | $CuCl_2 \cdot 2NH_4Cl$ | 0.74 | 44.0 |

Note:
*Example 1
**Example 2

What is claimed is:

1. A method of removing NOx from a gas containing NOx at a low concentration, comprising contacting said gas with an adsorbent which comprises at least one copper salt supported on natural or synthetic zeolite, wherein said adsorbent is prepared by immersing said natural of synthetic zeolite in a solution of said copper salt in a solvent and then drying off the solvent so that the copper salt in dried form is supported on the zeolite.

2. A method according to claim 1, wherein said copper salt is selected from the group consisting of copper chloride, double salts of copper chloride, and ammine complex salts of copper chloride.

3. A method according to claim 1, wherein said copper salt is an ammine complex salt of copper chloride.

4. An apparatus for purifying an NOx-containing gas comprising:
   (1) an adsorptive dehumidifier for dehumidifying said NOx-containing gas with a dehumidifying agent and regenerating the dehumidifying agent with purified gas produced by said apparatus;
   (2) an adsorptive denitration unit provided with an NOx adsorbent for denitrating the dehumidified NOx-containing gas; and
   (3) a denitration reactor;
   wherein said adsorptive denitration unit comprises an adsorbent regenerating zone wherein the used NOx adsorbent is regenerated with a regenerating gas containing $NH_3$, said adsorbent regenerating zone being provided with a gas recycling channel for recycling a portion of said regenerating gas containing $NH_3$ after its exit from the adsorbent regenerating zone back to the adsorptive denitration unit, and with a gas withdrawing channel for withdrawing another portion of said regenerating gas containing $NH_3$ from said gas recycling channel, passing the withdrawn gas through said denitration reactor and then releasing the denitrated gas produced by the denitration reactor into the atmosphere.

5. An apparatus as defined in claim 4 wherein each of the adsorptive dehumidifier and the adsorptive denitration unit is a rotary adsorber for continuously moving the dehumidifying agent or NOx adsorbent therein at right angles with the flow of gas.

6. An apparatus as defined in claim 5 wherein the rotary adsorptive dehumidifier comprises a dehumidifying rotor, and the rotor is an assembly of dehumidifying plates comprising silica gel as a water adsorbent and arranged in layers with a suitable spacer interposed between adjacent plates, an assembly of flat dehumidifying plates and corrugated dehumidifying plates alternately arranged in layers and comprising silica gel as a water adsorbent, or a unitary honeycomb dehumidifying structure comprising silica gel as a water adsorbent.

7. An apparatus as defined in claim 5 wherein the rotary adsorptive dehumidifier comprises a dehumidifying rotor, and the rotor is provided with an NOx-containing gas channel so that the NOx-containing gas before dehumidification flows locally through the rotor and with a purified gas channel so that the regenerating dry gas flows through the rotor at a portion thereof other than the portion for the NOx-containing gas to flow through before dehumidification.

8. An apparatus as defined in claim 7 wherein the rotary adsorptive denitration unit comprises an NOx adsorbent rotor, and the adsorbent rotor has the NOx-containing gas channel so that the NOx-containing gas after dehumidification flows locally through the adsorbent rotor and the gas recycling channel so that the $NH_3$-containing regenerating recycle gas flows through the adsorbent rotor at a portion thereof other than the portion for the NOx-containing gas to flow through after dehumidification.

9. An apparatus as defined in claim 5 wherein the rotary adsorptive denitration unit comprises an NOx adsorbent rotor, and the rotor is an assembly of plates of an adsorbent comprising a copper salt supported on a zeolite carrier and arranged in layers with a suitable spacer interposed between the adjacent plates, an assembly of flat adsorbent plates and corrugated adsorbent plates arranged alternately in layers and made of an adsorbent comprising a copper salt supported on a zeolite carrier, or an adsorbent comprising a copper salt supported on a zeolite carrier in the form of a unitary honeycomb structure.

10. An agent for removing NOx by adsorption from a gas containing NOx at a low concentration, said agent comprising at least one copper salt supported on natural or synthetic zeolite, wherein said agent is prepared by immersing said natural or synthetic zeolite in a solution of said copper salt in a solvent and then drying off the solvent so that the copper salt in dried form is supported on the zeolite.

11. An agent according to claim 10, wherein said copper salt is selected from the group consisting of copper chloride, double salts of copper chloride, and ammine complex salts of copper chloride.

12. An agent according to claim 10, wherein said copper salt is an ammine complex salt of copper chloride.

13. An agent according to claim 10, wherein the amount of said copper salt supported on the zeolite is 0.1 to 20% by weight, calculated as copper metal and based on the weight of the agent.

* * * * *